(12) United States Patent
Wei et al.

(10) Patent No.: US 9,061,906 B2
(45) Date of Patent: Jun. 23, 2015

(54) THERMOACOUSTIC DEVICE

(71) Applicants: Tsinghua University, Beijing (CN);
HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN);
HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/928,978

(22) Filed: Jun. 27, 2013

(65) Prior Publication Data

US 2014/0185841 A1     Jul. 3, 2014

(30) Foreign Application Priority Data

Dec. 28, 2012  (CN) .......................... 2012 1 0582215

(51) Int. Cl.
*H04R 23/00*   (2006.01)
*B82Y 30/00*   (2011.01)

(52) U.S. Cl.
CPC .............. *B82Y 30/00* (2013.01); *H04R 23/002* (2013.01)

(58) Field of Classification Search
CPC ............................ H04R 23/002; H04R 23/006
USPC ........................................................ 381/164
See application file for complete search history.

(56) References Cited

U.S. PATENT DOCUMENTS

| | | | |
|---|---|---|---|
| 1,135,686 A * | 4/1915 | Gwozdz ........................ | 381/164 |
| 2007/0164632 A1 | 7/2007 | Adachi et al. | |
| 2010/0166232 A1 * | 7/2010 | Liu et al. ....................... | 381/164 |
| 2010/0166233 A1 | 7/2010 | Liu | |
| 2011/0110535 A1 * | 5/2011 | Jiang et al. .................... | 381/111 |
| 2011/0255697 A1 * | 10/2011 | Qian et al. ...................... | 381/17 |
| 2012/0250907 A1 | 10/2012 | Jiang et al. | |

FOREIGN PATENT DOCUMENTS

| | | |
|---|---|---|
| CN | 101771920 | 7/2010 |
| JP | 4-206976 | 7/1992 |
| JP | 4981847 | 8/2009 |
| JP | 2012-209923 | 10/2012 |
| TW | 201125373 | 7/2011 |

* cited by examiner

*Primary Examiner* — Curtis Kuntz
*Assistant Examiner* — Ryan Robinson
(74) *Attorney, Agent, or Firm* — Novak Druce Connolly Bove + Quigg LLP

(57) ABSTRACT

A thermoacoustic device includes a first substrate, a sound wave generator, a first electrode, a second electrode and a second substrate. A number of recesses are defined on a surface of the first substrate. The sound-producing parts of the wave generator are located on the surface and suspended over the recesses to enable very rapid expansion by heat, and contraction. The first electrode and the second electrode are spaced from each other and electrically connected to the sound wave generator. The sound wave generator is held in place by the first substrate and the second substrate. A number of through holes are defined by the second substrate. Some of the through holes correspond with the recesses to allow the output of sound.

17 Claims, 9 Drawing Sheets

THERMOACOUSTIC DEVICE

RELATED APPLICATIONS

This application claims all benefits accruing under 35 U.S.C. §119 from China Patent Application No. 201210582215.X, filed on Dec. 28, 2012 in the China Intellectual Property Office, the contents of which are hereby incorporated by reference.

BACKGROUND

1. Technical Field

The present disclosure relates to thermoacoustic devices and, particularly, to a carbon nanotube based thermoacoustic device.

2. Description of Related Art

An acoustic device generally includes an electrical signal output device and a loudspeaker. The electrical signal output device inputs electrical signals into the loudspeaker. The loudspeaker receives the electrical signals and then transforms them into sounds.

There are different types of loudspeakers that can be categorized according by their working principles, such as electro-dynamic loudspeakers, electromagnetic loudspeakers, electrostatic loudspeakers and piezoelectric loudspeakers.

Thermoacoustic effect is a conversion of heat to sound. The thermoacoustic effect is distinct from the mechanism of the conventional loudspeaker, in which the pressure waves are created by the mechanical movement of the diaphragm. When signals are inputted into a sound wave generator, heat is produced in the sound wave generator according to the variations of the signal and/or signal strength. Heat propagates into surrounding medium. The heating of the medium causes thermal expansion and produces pressure waves in the surrounding medium, resulting in sound wave generation. Such an acoustic effect induced by temperature waves is commonly called "the thermoacoustic effect".

Carbon nanotubes (CNT) are a novel carbonaceous material having extremely small size and extremely large specific surface area. Carbon nanotubes have received a great deal of interest since the early 1990s, and have interesting and potentially useful electrical and mechanical properties, and have been widely used in a plurality of fields. The carbon nanotube film used in the thermoacoustic device has a large specific surface area, and extremely small heat capacity per unit area that make the sound wave generator emit sound which is audible to humans. However, the carbon nanotube film used in the thermoacoustic device has a small thickness and a large area, and can be very easily to be damaged by the external forces applied thereon.

What is needed, therefore, is to provide a thermoacoustic device for solving the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

Figure 1:
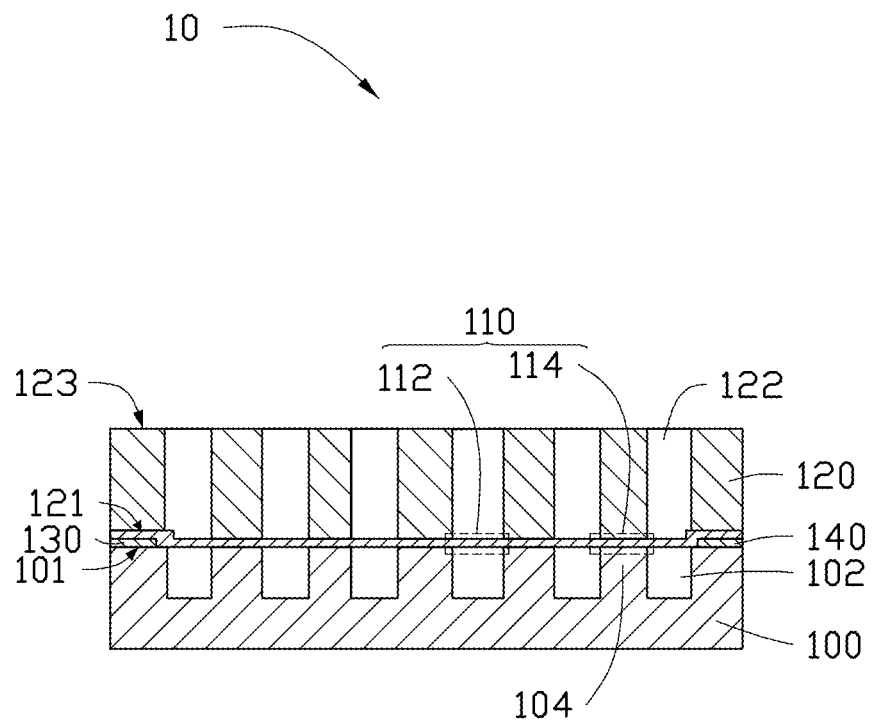
FIG. 1 is a cross-sectional view of one embodiment of a thermoacoustic device.
Figure 2:
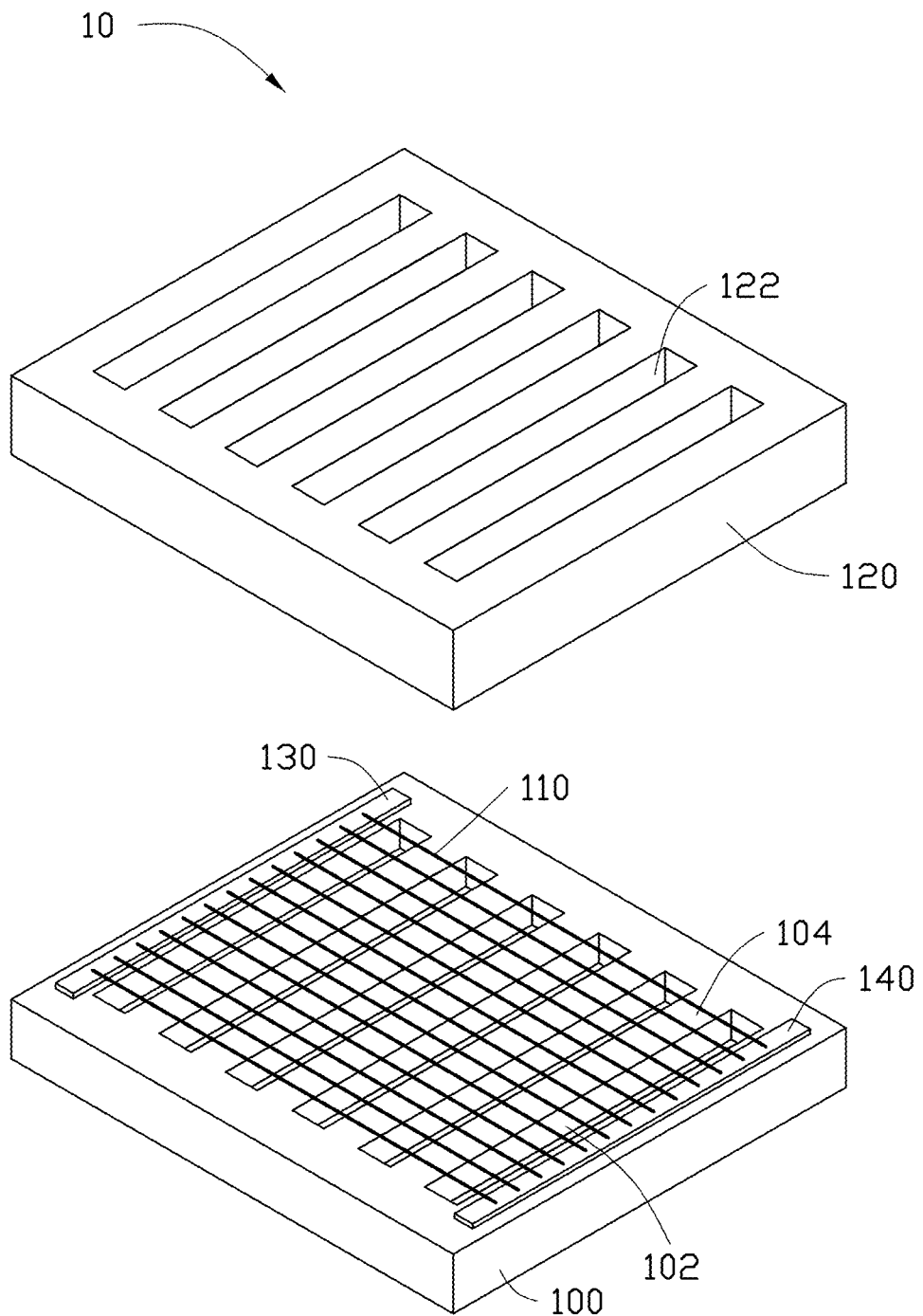
FIG. 2 is an exploded, isometric view of the thermoacoustic device of FIG. 1.

FIGS. 1-2 show a thermoacoustic device 10 of one embodiment. The thermoacoustic device 10 includes a first substrate 100, a sound wave generator 110, a second substrate 120, a first electrode 130, and a second electrode 140. The first substrate 100, the sound wave generator 110, and the second substrate 120 are stacked together. The first electrode 130 and the second electrode 140 are spaced from each other and electrically connected to the sound wave generator 110. The sound wave generator 110, the first electrode 130, and the second electrode 140 are located between the first substrate 100 and the second substrate 120.

The first substrate 100 has a first surface 101. A plurality of recesses 102 is defined in the first substrate 100. The plurality of recesses 102 are spaced from and parallel with each other. The sound wave generator 110 is attached on the first surface 101 and is suspended over the plurality of recesses 102. The second substrate 120 has a second surface 121 and a third surface 123, opposite to the second surface 121. The second substrate 120 is attached on a surface of the sound wave generator 110 away from the first substrate 100. The sound wave generator 110 is located between the first surface 101, of the first substrate 100, and the second surface 121, of the second substrate 120. A plurality of through holes 122 is defined by the second substrate 120. The plurality of through holes 122 extends from the second surface 121 to the third surface. The plurality of through holes 122 allow sound produced by the sound wave generator 110 to be transmitted outside. Some of the through holes 122 correspond with the recesses 102.

The first substrate 100 and the second substrate 120 are sheets of material. The shapes of the first substrate 100 and the second substrate 120 can be circular, square, rectangular or other geometric figure. The shapes of the first substrate 100 and the second substrate 120 are the same in order to hold the sound wave generator 110 in place. The resistances of the first substrate 100 and the second substrate 120 are greater than the resistance of the sound wave generator 110 to avoid a short circuit through the first substrate 100 or the second substrate 120. The first substrate 100 and the second substrate 120 have good thermal insulating properties to avoid absorbing the heat generated by the sound wave generator 110. The sizes of the first substrate 100 and the second substrate 120 ranges from about 25 square millimeters to about 100 square millimeters.

The thickness of each of the first substrate 100 and the second substrate 120 can range from about 0.1 millimeters to about 1 centimeter. The thickness of the first substrate 100 can be different from that of the second substrate 120.

The first substrate 100 and the second substrate 120 can be made of a flexible material or a flexible plate such as PCB. The flexible material can be polycarbonate (PC), polymethyl methacrylate acrylic (PMMA), polyethylene terephthalate (PET), polyethersulfone (PES), polyvinyl chloride (PVC), benzocyclobutenes (BCB), polyesters, acrylic resins, acrylonitrile butadiene styrene (ABS), polyamide (PA), or combination thereof. When the first substrate 100 and the second substrate 120 are printed and wired boards, the sound wave generator 110 can be located on the printed and wired boards directly, and will work on the input of signals.

In one embodiment, the first substrate 100 and the second substrate 120 are made of PET, the shape of each of the first substrate 100 and the second substrate 120 is square, a length of each side of each of the first substrate 100 and the second substrate 120 is about 10 centimeters, and each of the first substrate 100 and the second substrate 120 has a thickness of about 0.6 millimeters.

Each of the plurality of recesses 102 is in the first surface 101 of the first substrate 100. The plurality of recesses 102 can be uniformly dispersed on the first surface 101 such as being dispersed in an array. The plurality of recesses 102 can also be randomly dispersed. In one embodiment, the plurality of recesses 102 extends along the same direction, and spaced a certain distance from each other. The shape of the recess 102 can be a through hole, a blind recess (i.e., a depth of the recess 102 is less than a thickness of the first substrate 100), or a blind hole. Each of the plurality of recesses 102 includes a bottom and a sidewall adjacent to the bottom. The first portion 112 is spaced from the bottom and the sidewall. A bulge 104 is formed between adjacent two recesses 102.

A depth of the recess 102 can range from about 100 micrometers to about 200 micrometers. The sound waves reflected by the bottom surface of the blind recesses may be superimposed on the original sound waves, which may lead to an interference destructive. To reduce this effect, the depth of the blind recesses can be less than about 200 micrometers. In another aspect, when the depth of the blind recesses is less than 100 micrometers, the heat generated by the sound wave generator 110 is insufficiently dissipated. To reduce this effect, the depth of the blind recesses and holes can be greater than 100 micrometers.

The plurality of recesses 102 can be parallel with each other and extend along the same direction. A distance $d_1$ between adjacent two recesses 102 can range from about 20 micrometers to about 200 micrometers. Thus the first electrode 130 and the second electrode 140 can be printed on the first substrate 100 via nano-imprinting method. A cross section of the recess 102 along the extending direction can be V-shaped, rectangular, or trapezoidal. In one embodiment, a width of the recess 102 can range from about 0.2 millimeters to about 1 micrometer. Thus, sound wave generator 110 is effectively cocooned and protected from being broken. Furthermore, a driving voltage of the sound wave generator 110 can be lower than 12V. In one embodiment, the driven voltage of the sound wave generator 110 is lower than or equal to 5V. In one embodiment, the shape of the recess 102 is trapezoidal. An angle α is defined between the sidewall and the bottom. The angle α is equal to the crystal plane angle of the first substrate 100. In one embodiment, the width of the recess 102 is about 0.6 millimeters, the depth of the recess 102 is about 150 micrometers, the distance $d_1$ between adjacent two recesses 102 is about 100 micrometers, and the angle α is about 54.7 degrees.

The sound wave generator 110 is located on the first surface 101 and insulated from the first substrate 100 by the insulating layer (not shown). The sound wave generator 110 defines a first portion 112 and a second portion 114. The first portion 112 is suspended over the plurality of recesses 102, and the second portion 114 is attached on the plurality of bulges 104. The second portion 114 can be attached on the plurality of bulges 104 via an adhesive layer or adhesive particles (not shown).

The sound wave generator 110 has a very small heat capacity per unit area. The heat capacity per unit area of the sound wave generator 110 is less than $2\times10^{-4}$ J/cm$^2$*K. The sound wave generator 110 can be a conductive structure with a small heat capacity per unit area and a small thickness. The sound wave generator 110 can have a large specific surface area for causing pressure oscillations in the surrounding medium by the temperature waves generated by the sound wave generator 110. The sound wave generator 110 can be a free-standing structure. The term "free-standing" includes, but is not limited to, a structure that does not have to be supported by a substrate and can sustain the weight of itself when it is hoisted by a portion thereof without any significant damage to its structural integrity. The suspended part of the sound wave generator 110 will have more sufficient contact with the surrounding medium (e.g., air) to have heat exchange with the surrounding medium from both sides of the sound wave generator 110. The sound wave generator 110 is a thermoacoustic film.

The sound wave generator 110 can be or include a free-standing carbon nanotube structure. The carbon nanotube structure may have a film structure. The thickness of the carbon nanotube structure may range from about 0.5 nanometers to about 1 millimeter. The carbon nanotubes in the carbon nanotube structure are combined by van der Waals attractive force therebetween. The carbon nanotube structure has a large specific surface area (e.g., above 30 m$^2$/g). The larger the specific surface area of the carbon nanotube structure, the smaller the heat capacity per unit area will be. The smaller the heat capacity per unit area, the louder will be the sound produced by the sound wave generator 110.

The carbon nanotube structure can include at least one carbon nanotube film, a plurality of carbon nanotube wires, or a combination of carbon nanotube film and a plurality of carbon nanotube wires.

The carbon nanotube film can be a drawn carbon nanotube film formed by drawing a film from a carbon nanotube array that is capable of having a film drawn therefrom. The heat capacity per unit area of the drawn carbon nanotube film can be less than or equal to about $1.7\times10^{-6}$ J/cm$^2$*K. The drawn carbon nanotube film can have a large specific surface area (e.g., above 100 m$^2$/g). In one embodiment, the drawn carbon nanotube film has a specific surface area in the range from about 200 m$^2$/g to about 2600 m$^2$/g. In one embodiment, the drawn carbon nanotube film has a specific weight of about 0.05 g/m$^2$.

The thickness of the drawn carbon nanotube film can be in a range from about 0.5 nanometers to about 100 nanometers. When the thickness of the drawn carbon nanotube film is small enough (e.g., smaller than 10 micrometers), the drawn carbon nanotube film is substantially transparent.

Figure 3:
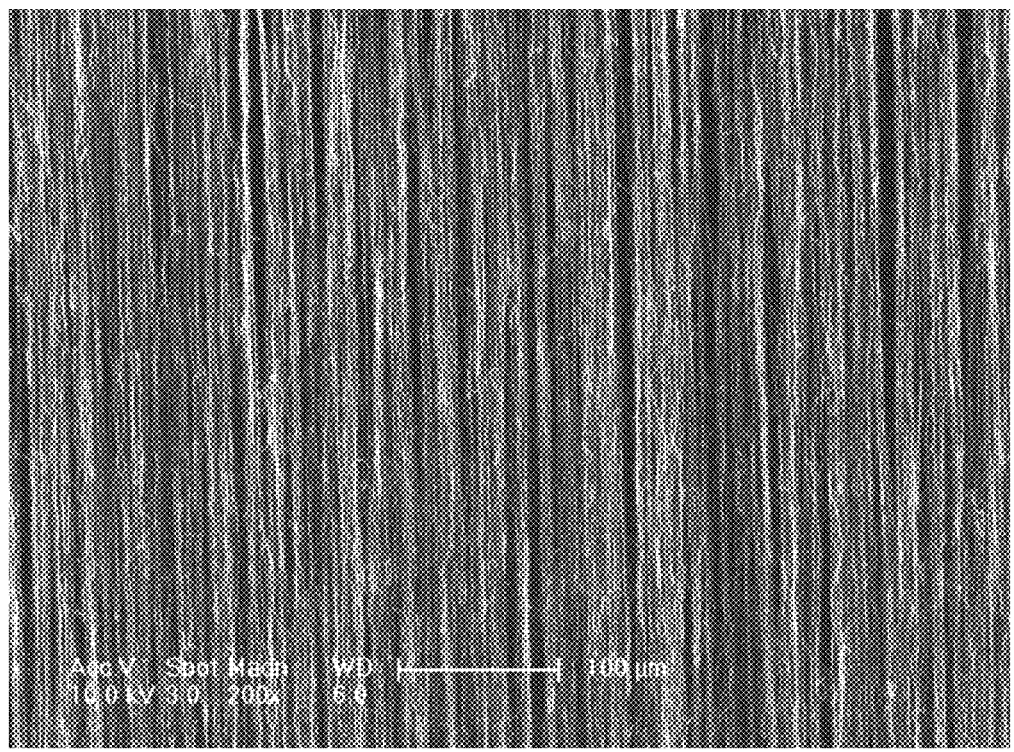
FIG. 3 shows a scanning electron microscope (SEM) image of a carbon nanotube film in the thermoacoustic device.

Referring to FIG. 3, the drawn carbon nanotube film includes a plurality of successive and oriented carbon nanotubes joined end-to-end by van der Waals attractive force therebetween. The carbon nanotubes in the drawn carbon nanotube film can be substantially oriented along a single direction and substantially parallel to the surface of the carbon nanotube film. Furthermore, an angle β can exist between the oriented direction of the carbon nanotubes in the drawn carbon nanotube film and the extending direction of the plurality of recesses 102, and 0<β≤90°. In one embodiment, the oriented direction of the plurality of carbon nanotubes is perpendicular to the extending direction of the plurality of recesses 102. As can be seen in FIG. 3, some variations can occur in the drawn carbon nanotube film. The drawn carbon nanotube film is a free-standing film. The drawn carbon nanotube film can be formed by drawing a film from a carbon nanotube array that is capable of having a carbon nanotube film drawn therefrom. Furthermore, the plurality of carbon nanotubes is substantially parallel with the first surface 101.

The carbon nanotube structure can include more than one carbon nanotube films. The carbon nanotube films in the carbon nanotube structure can be coplanar and/or stacked. Coplanar carbon nanotube films can also be stacked one upon other coplanar films. Additionally, an angle can exist between the orientation of carbon nanotubes in adjacent films, stacked and/or coplanar. Adjacent carbon nanotube films can be combined merely by van der Waals attractive force therebetween without the need of an additional adhesive. The number of the layers of the carbon nanotube films is not limited. However, as the stacked number of the carbon nanotube films increases, the specific surface area of the carbon nanotube structure will decrease. A large enough specific surface area (e.g., above 30 $m^2/g$) must be maintained to achieve an acceptable acoustic volume. An angle θ between the aligned directions of the carbon nanotubes in the adjacent two drawn carbon nanotube films can range from about 0 degrees to about 90 degrees. Spaces are defined between adjacent two carbon nanotubes in the drawn carbon nanotube film. When the angle θ between the aligned directions of the carbon nanotubes in adjacent drawn carbon nanotube films is larger than 0 degrees, a microporous structure is defined by the carbon nanotubes in the sound wave generator 110. The carbon nanotube structure in an embodiment employing these films will have a plurality of micropores. Stacking the carbon nanotube films will add to the structural integrity of the carbon nanotube structure.

Each of the plurality of carbon nanotube wires is parallel with and spaced from each other. The plurality of carbon nanotube wires intersect with the plurality of recesses 102. In one embodiment, the plurality of carbon nanotube wires is perpendicular to the plurality of recesses 102. Each of the plurality of carbon nanotube wires includes a plurality of carbon nanotubes, and the extending direction of the plurality of carbon nanotubes is parallel with the carbon nanotube wire. The plurality of carbon nanotube wires is suspended over the plurality of recesses 102.

A distance between adjacent two carbon nanotube wires ranges from about 0.1 micrometers to about 200 micrometers, such as 50 micrometers, 150 micrometers. In one embodiment, the distance between adjacent two carbon nanotube wires is about 120 micrometers. A diameter of the carbon nanotube wire ranges from about 0.5 nanometers to about 100 micrometers. In one embodiment, the distance between adjacent two carbon nanotube wires is about 120 micrometers, and the diameter of the carbon nanotube wire is about 1 micrometer.

Figure 4:
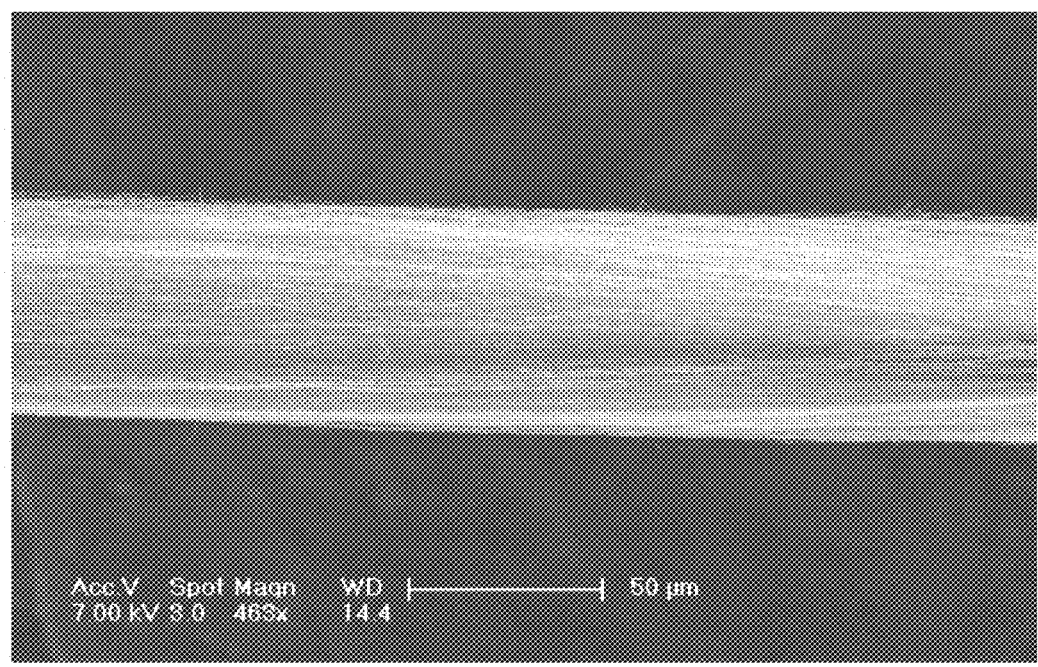
FIG. 4 shows an SEM image of an untwisted carbon nanotube wire.

The carbon nanotube wire can be untwisted or twisted. Treating the drawn carbon nanotube film with a volatile organic solvent forms the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus the drawn carbon nanotube film will be shrunk into untwisted carbon nanotube wire. Referring to FIG. 4, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nanometers to about 100 micrometers.

Figure 5:
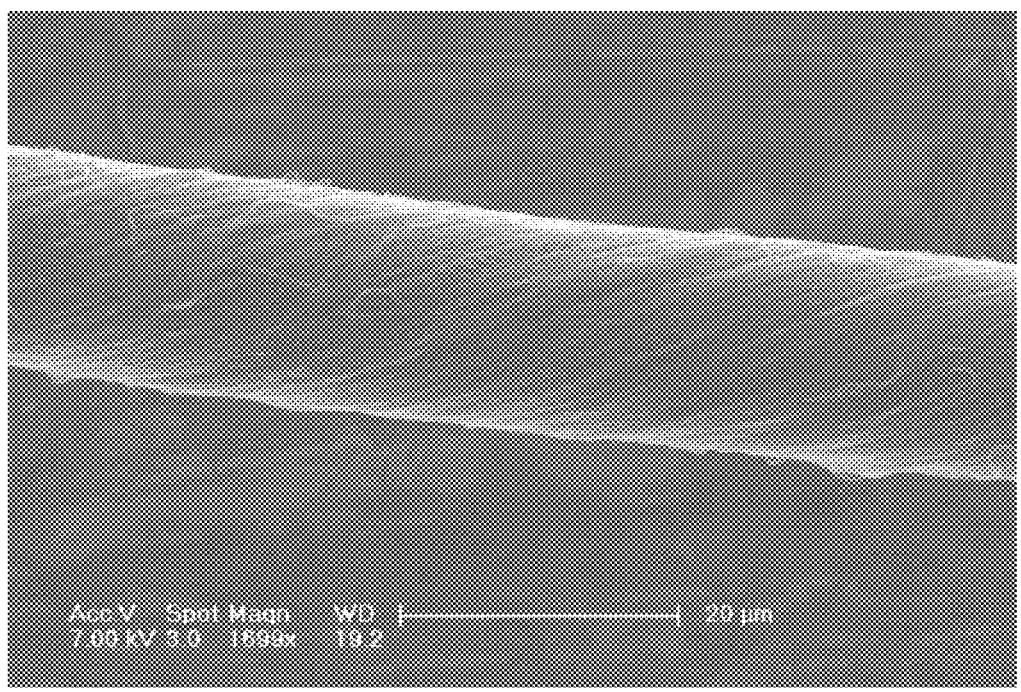
FIG. 5 shows an SEM image of a twisted carbon nanotube wire.

The twisted carbon nanotube wire can be formed by twisting a drawn carbon nanotube film using a mechanical force to turn the two sides of the drawn carbon nanotube film in opposite directions. Referring to FIG. 5, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased. Deformation of the sound wave generator 110 during working is reduced, and any distortion of the sound waves reduce.

In some embodiments, the sound wave generator 110 is a single drawn carbon nanotube film drawn from the carbon nanotube array. The drawn carbon nanotube film has a thickness of about 50 nanometers, and has a light-transmittance of visible light in a range from 67% to 95%.

In other embodiments, the sound wave generator 110 can be or include a free-standing carbon nanotube composite structure. The carbon nanotube composite structure can be formed by depositing at least a conductive layer on the outer surface of the individual carbon nanotubes in the above-described carbon nanotube structure. The carbon nanotubes can be individually coated or partially covered with conductive material. Thereby, the carbon nanotube composite structure inherits the properties of the carbon nanotube structure such as the large specific surface area, the high transparency, the small heat capacity per unit area. Further, the conductivity of the carbon nanotube composite structure is greater than the pure carbon nanotube structure. Thereby, the driven voltage of the sound wave generator 110 using a coated carbon nanotube composite structure can be further decreased. The conductive material can be placed on the carbon nanotubes by using a method of vacuum evaporation, sputtering, chemical vapor deposition (CVD), electroplating, or electroless plating.

The first electrode 130 and the second electrode 140 are in electrical contact with the sound wave generator 110, and used to input electrical signals into the sound wave generator 110. The first electrode 130 and the second electrode 140 can be located on any surface of the sound wave generator 110. The thermoacoustic device 10 further includes a plurality of conductive wires. The plurality of conductive wires is electrically connected with the first electrode 130 and the second electrode 140. When the first electrode 130 and the second electrode 140 are located on the first surface 101 of the first substrate 100, the conductive wires will be located in and insulated from the first substrate 100. When the first electrode 130 and the second electrode 140 are located on the surface of the sound wave generator 110 far away from the first substrate 100, the conductive wires will be located in and insulated from the second substrate 120.

The first electrode 130 and the second electrode 140 are made of conductive material. The shape of the first electrode 130 or the second electrode 140 is not limited and can be lamellar, rod like, wirelike, and a simple block, among other shapes. A material of the first electrode 130 or the second electrode 140 can be metals, conductive adhesives, carbon nanotubes, and indium tin oxides among other conductive materials. The first electrode 130 and the second electrode 140 can be metal wire or conductive material layers, such as metal layers formed by a sputtering method, or conductive paste layers formed by a method of screen-printing.

The first electrode 130 and the second electrode 140 are electrically connected to two terminals of an electrical signal input device (such as a MP3 player) by the conductive wires. Thereby, electrical signals output from the electrical signal device can be input into the sound wave generator 110 through the first electrode 130 and the second electrode 140.

Furthermore, a heat sink (not shown) can be located on the first substrate 100, and the heat produced by the sound wave generator 110 can be transferred into the heat sink and the overall temperature of the sound wave generator 110 can be reduced.

The second substrate 120 is attached with the sound wave generator 110. The plurality of through holes 122 and the plurality of recesses 102 are located with a one-to-one correspondence. The first portion 112 of the sound wave generator 110 is suspended. The second substrate 120 can anchor and protect the sound wave generator 110. The plurality of through holes 122 can transfer the sound waves generated by the sound wave generator 110. A cross section of the through hole 122, taken along a direction perpendicular to the second surface 121 of the second substrate 120, can be V-shaped, rectangular, or trapezoidal. In one embodiment, the cross section of the through hole 122 is rectangular and the area of the cross section of the through hole 122 is the same as the cross section of the recess 102.

The sound wave generator 110 is driven by electrical signals and converts the electrical signals into heat energy. The heat capacity per unit area of the carbon nanotube structure is extremely small, and thus, the temperature of the carbon nanotube structure changes very rapidly. Thermal waves, which are propagated into surrounding medium, are obtained. Therefore, the surrounding medium, such as ambient air, will be heated at a frequency of the electrical signals. The thermal expansions and contractions produce pressure waves in the surrounding medium, resulting in sound wave generation. In this process, it is the thermal expansion and contraction of the medium in the vicinity of the sound wave generator 110 that produces sound. The operating principle of the sound wave generator 110 is the "thermally-induced sound" conversion.

The thermoacoustic device 10 has following advantages. First, the sound wave generator 110, the first electrode 130, and the second electrode 140 are sandwiched between the first substrate 100 and the second substrate 120, thus the carbon nanotube structure can be effectively protected from damage. Second, the first substrate 100 and the second substrate 120 are flexible, thus the thermoacoustic device 10 itself is flexible. Third, the material of the first substrate 100 and the second substrate 120 are a flexible material, thus process of making the thermoacoustic device 10 is easy, simple, and low cost.

Figure 6:
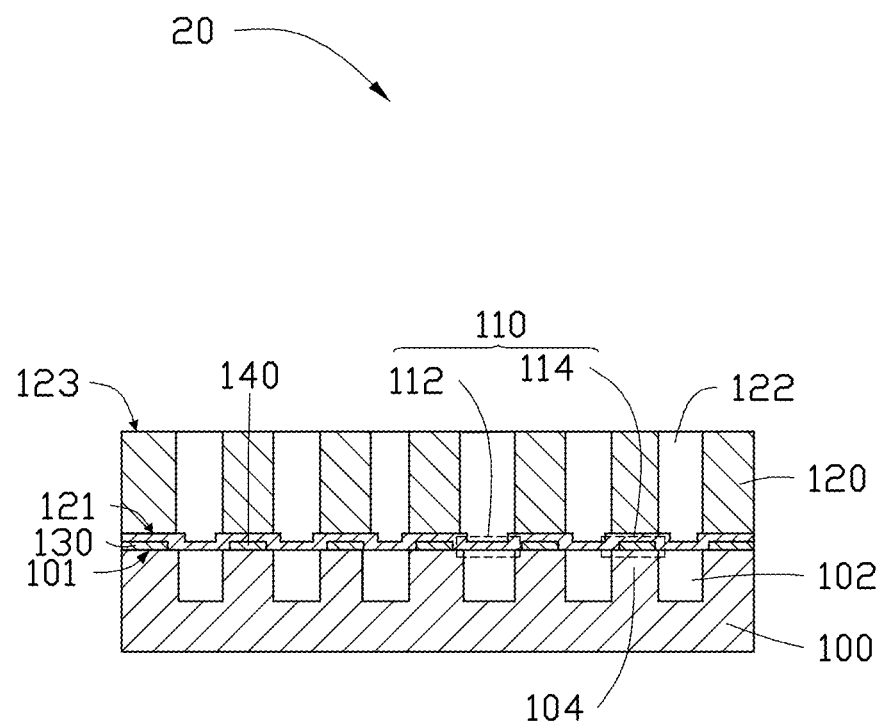
FIG. 6 is a cross-sectional view of another embodiment of a thermoacoustic device.
Figure 7:
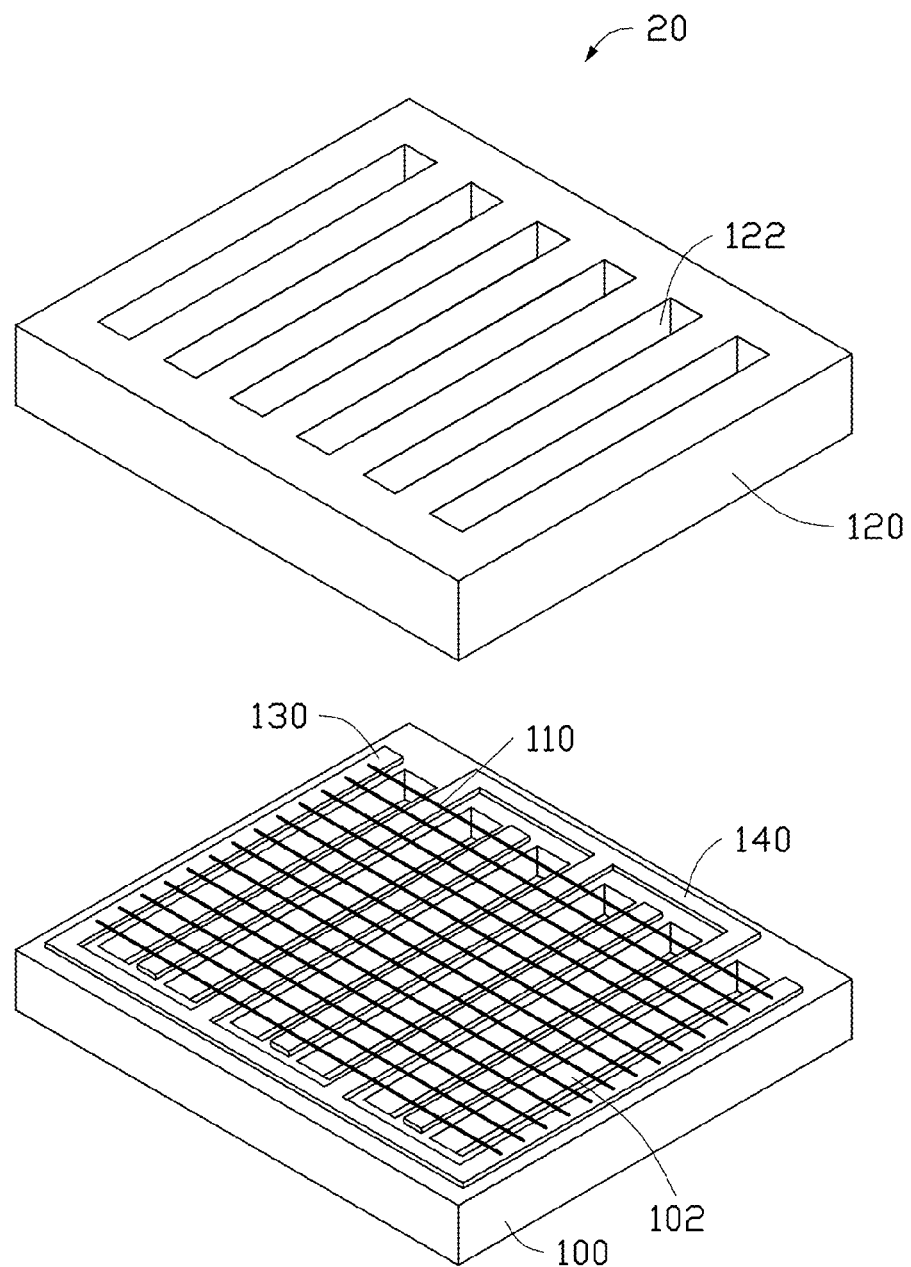
FIG. 7 is an exploded, isometric view of the thermoacoustic device of FIG. 6.

FIGS. 6-7 show one embodiment of a thermoacoustic device 20. The thermoacoustic device 20 includes a first substrate 100, a sound wave generator 110, a second substrate 120, a plurality of first electrodes 130, and a plurality of second electrodes 140.

The structure of the thermoacoustic device 20 is similar to that of the thermoacoustic device 10, except that the thermoacoustic device 20 includes the plurality of first electrodes 130 and the plurality of second electrodes 140.

The plurality of first electrodes 130 and the plurality of second electrodes 140 can be arranged in a staggered manner of "a-b-a-b-a-b . . . ". All the plurality of first electrodes 130 is electrically connected together and all the plurality of second electrodes 140 is electrically connected together, whereby the sections of the sound wave generator 110 between the adjacent first electrode 130 and the second electrode 140 are in parallel. An electrical signal is conducted in the sound wave generator 110 from the plurality of first electrodes 130 to the plurality of second electrodes 140. By placing the sections in parallel, the resistance of the thermoacoustic device unit is decreased. Therefore, the driving voltage of the thermoacoustic device unit can be decreased, for the same performance The plurality of first electrodes 130 and the plurality of second electrodes 140 can be substantially parallel to each other with a same distance between the adjacent first electrode 130 and the second electrode 140. The plurality of first electrodes 130 and the plurality of second electrodes 140 are alternatively located on the plurality of bulges 104. The sound wave generator 110 between adjacent first electrodes 130 and the second electrodes 140 is suspended over the plurality of recesses 102.

To connect all the plurality of first electrodes 130 together, and connect all the plurality of second electrodes 140 together, a first conducting member and a second conducting member can be arranged. All the plurality of first electrodes 130 are connected to the first conducting member. All the plurality of second electrodes 140 are connected to the second conducting member. The sound wave generator 110 is divided by the plurality of first electrodes 130 and the plurality of second electrodes 140 into many sections. The sections of the sound wave generator 110 between the adjacent first electrode 130 and the second electrode 140 are in parallel. An electrical signal is conducted in the sound wave generator 110 from the plurality of first electrodes 130 to the plurality of second electrodes 140.

The first conducting member and the second conducting member can be made of the same material as the plurality of first electrodes 130 and the plurality of second electrodes 140, and can be perpendicular to the plurality of first electrodes 130 and the plurality of second electrodes 140.

Figure 8:
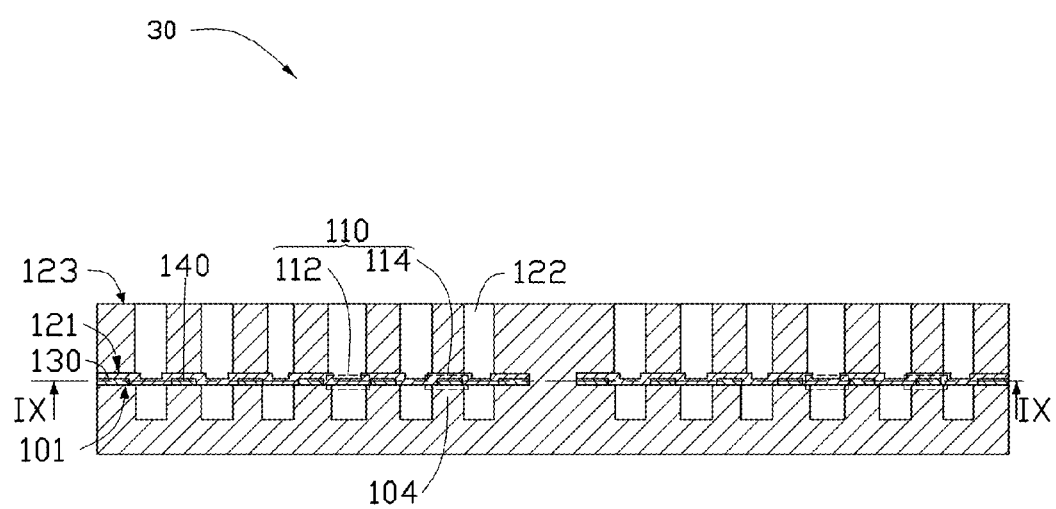
FIG. 8 is a cross-sectional view of another embodiment of a thermoacoustic device.
Figure 9:
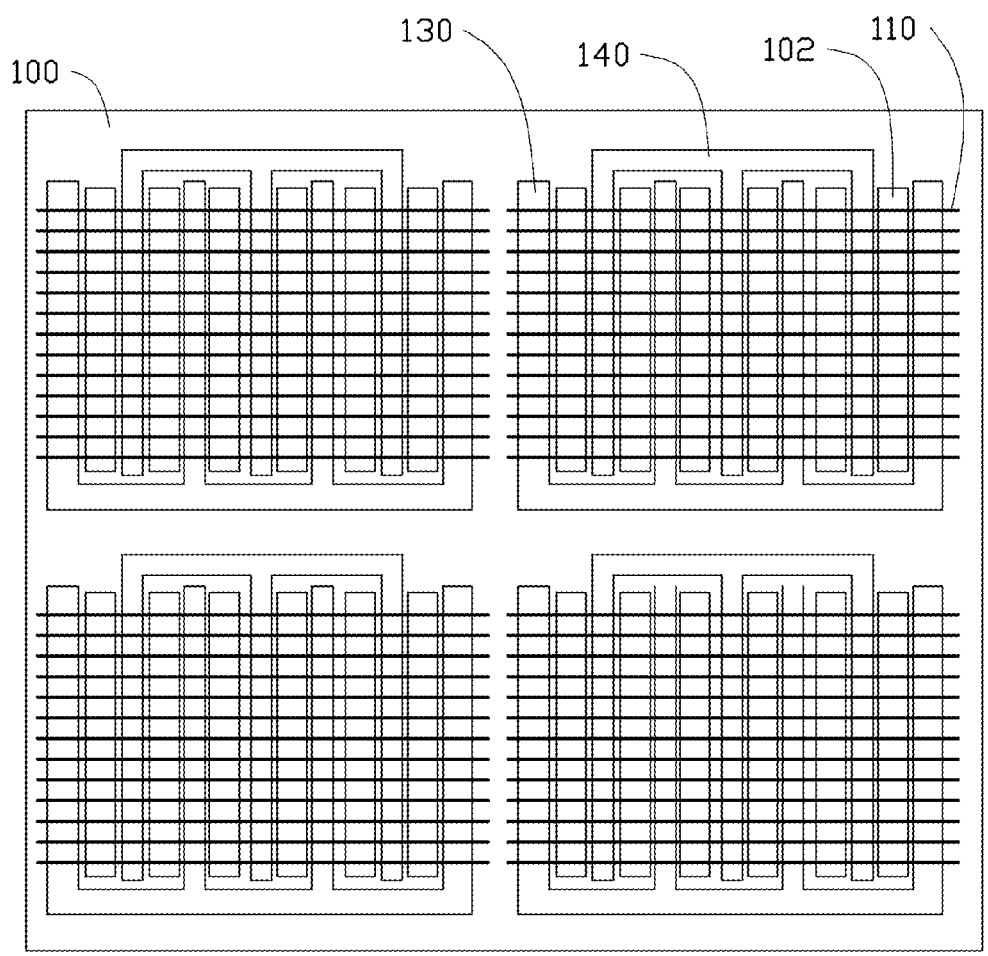
FIG. 9 is a cross-sectional view of the thermoacoustic device along line IX-IX of FIG. 8.

FIGS. 8-9 show one embodiment of a thermoacoustic device 30. The thermoacoustic device 30 includes a first substrate 100, a second substrate 120, and a plurality of thermoacoustic device units. Each of the plurality of thermoacoustic device units includes a sound wave generator 110, a first electrode 130, and a second electrode 140.

The structure of the thermoacoustic device 30 is similar to that of the thermoacoustic device 20, except that the thermoacoustic device 30 includes a plurality of thermoacoustic device units, and each of the plurality of thermoacoustic device units includes a sound wave generator 110, a first electrode 130, and a second electrode 140.

A plurality of cells is defined on the first surface 101 of the first substrate 100. At least one recess 102 is located in each of the plurality of cells. Each of the plurality of thermoacoustic device units is located in one of the plurality of cells. The first electrode 130 and the second electrode 140 of each of the plurality of thermoacoustic device units are spaced from each other and electrically connected to the sound wave generator 110. The sound wave generator 110 is suspended over the plurality of recesses 102. Every adjacent two of the plurality of thermoacoustic device units are independent and spaced from each other.

The thermoacoustic device 30 has following advantages. First, every adjacent two of the plurality of thermoacoustic device units are independent and spaced from each other, and the working status of each of the plurality of sound wave generators 110 can be controlled separately and independently by inputting separate and independent signals. Second, the thermoacoustic device 30 can be easily divided into a plurality of individual thermoacoustic device units by cutting the first substrate 100 and the second substrate 120 according to the plurality of cells.

It is to be understood that the above-described embodiments are intended to illustrate rather than limit the invention. Variations may be made to the embodiments without departing from the spirit of the invention as claimed. Any elements discussed with any embodiment are envisioned to be able to be used with the other embodiments. The above-described embodiments illustrate the scope of the invention but do not restrict the scope of the invention.

What is claimed is:

1. A thermoacoustic device, the thermoacoustic device comprising:
   a first substrate comprising a first surface, wherein the first substrate defines a plurality of recesses on the first surface;
   a second substrate, wherein the second substrate defines a plurality of through holes, and some of the plurality of through holes correspond with the plurality of recesses;
   a sound wave generator; and
   a first electrode and a second electrode spaced from each other and electrically connected to the sound wave generator,
   wherein the sound wave generator, the first electrode, and the second electrode are sandwiched between the first substrate and the second substrate, and the sound wave generator is suspended over the plurality of recesses, and a thickness of each of the first substrate and the second substrate ranges from about 0.6 millimeters to about 1 centimeter.

2. The thermoacoustic device of claim 1, wherein the first substrate and the second substrate comprise a flexible material.

3. The thermoacoustic device of claim 1, wherein the second substrate comprises a second surface and a third surface, opposite to the second surface, and the plurality of through holes extends from the second surface to the third surface.

4. The thermoacoustic device of claim 1, wherein the plurality of through holes and the plurality of recesses are located with a one-to-one correspondence, and each of the plurality of through holes is opposite to one of the plurality of recesses.

5. The thermoacoustic device of claim 1, wherein a depth of each of the plurality of recesses ranges from about 100 micrometers to about 200 micrometers.

6. The thermoacoustic device of claim 1, wherein a shape of each of the plurality of recesses is a through hole, a blind recess, or a blind hole.

7. The thermoacoustic device of claim 1, wherein the plurality of recesses are parallel with and spaced from each other.

8. The thermoacoustic device of claim 1, wherein the sound wave generator comprises a carbon nanotube structure, and the carbon nanotube structure comprises a plurality of carbon nanotubes substantially oriented along a first direction and parallel with the first surface.

9. The thermoacoustic device of claim 8, wherein the first electrode and the second electrode are located on two sides of the carbon nanotube structure along the first direction, and the plurality of carbon nanotubes extends from the first electrode to the second electrode.

10. The thermoacoustic device of claim 8, wherein the plurality of carbon nanotubes are joined end to end along the first direction.

11. The thermoacoustic device of claim 8, wherein the plurality of recesses extends along a second direction, an angle is formed between the first direction and the second direction, and the angle is greater than 0 degrees and less than or equal to 90 degrees.

12. The thermoacoustic device of claim 8, wherein the sound wave generator comprises a plurality of carbon nanotube wires extending along a same direction, and the plurality of carbon nanotube wires are parallel with and spaced from each other.

13. The thermoacoustic device of claim 12, wherein a distance between adjacent two of the plurality of carbon nanotube wires ranges from about 0.1 micrometers to about 200 micrometers.

14. The thermoacoustic device of claim 1, further comprising a plurality of third electrodes and a plurality of fourth electrodes, and the plurality of third electrodes and the plurality of fourth electrodes are alternatively located on a surface between adjacent two recesses.

15. A thermoacoustic device, the thermoacoustic device comprising:
   a first substrate comprising a surface defining a plurality of cells, wherein a plurality of recesses are spaced from each other and defined by the first substrate on each of the plurality of cells;
   a second substrate, wherein the second substrate defines a plurality of through holes, and some of the plurality of through holes correspond with the plurality of recesses;
   a plurality of thermoacoustic device units sandwiched between the first substrate and the second substrate, wherein each of the plurality of thermoacoustic device units is located in one of the plurality of cells, and comprises:
      a sound wave generator suspended over the plurality of recesses; and
      a first electrode and a second electrode, wherein the first electrode and the second electrode spaced from each other and electrically connected to the sound wave generator, and a thickness of each of the first substrate and the second substrate ranges from about 0.6 millimeters to about 1 centimeter.

16. The thermoacoustic device of claim 15, wherein adjacent two of the plurality of thermoacoustic device units are independent and spaced from each other.

17. A thermoacoustic device, the thermoacoustic device comprising:
- a first substrate comprising a first surface, wherein the first substrate defines a plurality of recesses on the first surface;
- a second substrate, wherein the second substrate defines a plurality of through holes, and some of the plurality of through holes correspond with the plurality of recesses;
- a sound wave generator; and
- a first electrode and a second electrode spaced from each other and electrically connected to the sound wave generator,
- wherein the sound wave generator, the first electrode, and the second electrode are located between the first substrate and the second substrate; the sound wave generator is suspended over the plurality of recesses; a thickness of each of the first substrate and the second substrate ranges from about 0.6 millimeters to about 1 centimeter; and a material of each of the first substrate and the second substrate is selected from the group consisting of polycarbonate, polymethyl methacrylate acrylic, polyethylene terephthalate, polyethersulfone, polyvinyl chloride, benzocyclobutenes, polyesters, acrylic resins, acrylonitrile butadiene styrene, polyamide, or combination thereof.

* * * * *